(12) United States Patent
Mo et al.

(10) Patent No.: US 9,813,168 B2
(45) Date of Patent: Nov. 7, 2017

(54) SELF-INTERFERENCE SIGNAL CANCELLATION DEVICE AND METHOD

(71) Applicant: Huawei Technologies Co., Ltd., Shenzhen, Guangdong (CN)

(72) Inventors: Taofu Mo, Chengdu (CN); Huajiong Lin, Chengdu (CN); Long Luo, Shenzhen (CN); Bo Han, Chengdu (CN); Weimin Chen, Chengdu (CN); Siqing Ye, Shenzhen (CN); Linjun Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/082,420

(22) Filed: Mar. 28, 2016

(65) Prior Publication Data

US 2016/0211927 A1 Jul. 21, 2016

Related U.S. Application Data

(63) Continuation of application No. PCT/CN2014/087679, filed on Sep. 28, 2014.

(30) Foreign Application Priority Data

Sep. 29, 2013 (CN) .......................... 2013 1 0462055

(51) Int. Cl.
*H04B 15/00* (2006.01)
*H04B 1/52* (2015.01)
(Continued)

(52) U.S. Cl.
CPC ............. *H04B 15/00* (2013.01); *H04B 1/123* (2013.01); *H04B 1/525* (2013.01)

(58) Field of Classification Search
CPC ........ H04B 1/525; H04B 1/126; H04B 15/00; H04B 1/10; H04B 1/109; H04B 1/123
See application file for complete search history.

(56) References Cited

U.S. PATENT DOCUMENTS 8,055,235 B1 * 11/2011 Gupta ...................... H04B 1/10
455/296
2008/0089397 A1 4/2008 Vetter et al.
(Continued)

FOREIGN PATENT DOCUMENTS

CN 101529729 A 9/2009
CN 102769487 A 11/2012
(Continued)

*Primary Examiner* — Yuwen Pan
*Assistant Examiner* — Zhitong Chen

(57) ABSTRACT

The present invention discloses a self-interference signal cancellation device. The device includes a first self-interference cancellation unit, configured to: obtain a first analog signal by coupling a transmit signal output by an analog transmit processing module; perform analog-to-digital conversion on the first analog signal, to obtain a first digital signal; perform interference reconstruction according to the first digital signal, to obtain a first digital interference cancellation signal; and cancel, according to the first digital interference cancellation signal, a self-interference signal included in a digital signal output by a first analog-to-digital conversion module, to obtain a first output signal, and output the first output signal to a digital receive processing module. In the present invention, after interference cancellation is performed by using the first digital interference cancellation signal and the digital signal output by the first analog-to-digital conversion module, a self-interference signal introduced during transmission can be canceled.

9 Claims, 6 Drawing Sheets

(51) Int. Cl.
H04B 1/12 (2006.01)
H04B 1/525 (2015.01)

(56) References Cited

U.S. PATENT DOCUMENTS

2013/0102254 A1* 4/2013 Cyzs ................. H04B 1/126
 455/63.1
2014/0348018 A1* 11/2014 Bharadia ............... H04L 5/1461
 370/252

FOREIGN PATENT DOCUMENTS

CN 103200140 A 7/2013
EP 2 752 997 A1 7/2014

* cited by examiner

SELF-INTERFERENCE SIGNAL CANCELLATION DEVICE AND METHOD

CROSS-REFERENCE TO RELATED APPLICATIONS

This application is a continuation of International Application No. PCT/CN2014/087679, filed on Sep. 28, 2014, which claims priority to Chinese Patent Application No. 201310462055.X, filed on Sep. 29, 2013, both of which are hereby incorporated by reference in their entireties.

TECHNICAL FIELD

The present invention relates to the field of wireless communications technologies, and in particular, to a self-interference signal cancellation device and method.

BACKGROUND

In a present communications system, communication is generally performed in an FDD (Frequency Division Duplex) manner or a TDD (Time Division Duplex) manner. In an FDD system, uplink and downlink communication is performed by means of different frequencies. In a mobile communications system in a TDD mode, receiving and transmission are performed in different timeslots on a same frequency channel (that is, carrier), and timeslots are used to differentiate a receive channel from a transmit channel. In both communication manners, for a signal, communication can be performed only within a period of time or in a specific frequency band.

A full-duplex wireless communications technology is a technology different from TDD and FDD. Co-time co-frequency communication can be implemented by using the technology. However, when two communications devices perform co-time co-frequency communication, a receive antenna not only receives a desired signal from a peer end, but also receives a signal transmitted by the receive antenna itself, that is, a self-interference signal. In addition, because a distance between a transmit antenna and the receive antenna is extremely close, strength of the self-interference signal is usually much higher than that of the desired signal from the peer end.

Currently, the following method is generally used to cancel the self-interference signal: a digital signal is obtained through coupling from a digital domain for transmission, the self-interference signal is then reconstructed, and finally, the self-interference signal is canceled in a digital domain for receiving. However, the method cannot cancel a phase noise, non-linearity, and a noise floor that are introduced at a transmit end, and therefore has poor self-interference cancellation performance.

SUMMARY

To solve a problem of the prior art, embodiments of the present invention provide a self-interference signal cancellation device and method. The technical solutions are as follows:

According to a first aspect, a self-interference signal cancellation device is provided, where the device includes: a digital transmit processing module, an analog transmit processing module, a first analog-to-digital conversion module, an analog receive processing module, and a digital receive processing module, where a transmit signal output by the analog transmit processing module is transmitted through an air interface to the first analog-to-digital conversion module, forming a self-interference signal, a digital signal output by the first analog-to-digital conversion module includes the self-interference signal, and the device further includes a first self-interference cancellation unit, where the first self-interference cancellation unit is configured to: obtain a first analog signal by coupling the transmit signal output by the analog transmit processing module; perform analog-to-digital conversion on the first analog signal, to obtain a first digital signal; perform interference reconstruction according to the first digital signal, to obtain a first digital interference cancellation signal; and cancel, according to the first digital interference cancellation signal, the self-interference signal included in the digital signal output by the first analog-to-digital conversion module, to obtain a first output signal, and output the first output signal to the digital receive processing module.

With reference to the first aspect, in a first possible implementation manner of the first aspect, the first self-interference cancellation unit includes: a first signal coupling module, a second analog-to-digital conversion module, a first digital interference reconstruction module, and a first digital interference cancellation module, where the first signal coupling module is configured to obtain the first analog signal by coupling the transmit signal output by the analog transmit processing module, and output the first analog signal to the first analog feedback processing module;

the second analog-to-digital conversion module is configured to perform analog-to-digital conversion on the first analog signal, to obtain the first digital signal, and output the first digital signal to the first digital interference reconstruction module;

the first digital interference reconstruction module is configured to perform interference reconstruction according to the first digital signal, to obtain the first digital interference cancellation signal, and output the first digital interference cancellation signal to the first digital interference cancellation module; and the first digital interference cancellation module is configured to cancel, according to the first digital interference cancellation signal, the self-interference signal included in the digital signal output by the first analog-to-digital conversion module, to obtain the first output signal, and output the first output signal to the digital receive processing module.

With reference to the foregoing possible implementation manner, in a second possible implementation manner of the first aspect, the device further includes: a second self-interference cancellation unit, where the second self-interference cancellation unit is configured to: perform interference reconstruction according to a digital transmit signal output by the digital transmit processing module, to obtain a second digital interference cancellation signal;

perform digital-to-analog conversion on the second digital interference cancellation signal, to obtain a first analog synthesis signal;

cancel, according to the first analog synthesis signal, a self-interference signal in an analog receive signal received by the receive antenna, to remove a linear part of the self-interference signal from the analog receive signal; and output a signal obtained through the cancellation to the analog receive processing module.

With reference to the foregoing possible implementation manner, in a third possible implementation manner of the first aspect, the second self-interference cancellation unit includes: a second digital interference reconstruction module, a second digital-to-analog conversion module, and a first signal synthesis module, where the second digital interference reconstruction module is configured to perform interference reconstruction according to the digital transmit signal output by the digital transmit processing module, to obtain the second digital interference cancellation signal, and output the second digital interference cancellation signal to the second digital-to-analog conversion module;

the second digital-to-analog conversion module is configured to perform digital-to-analog conversion on the second digital interference cancellation signal, to obtain the first analog synthesis signal, and output the first analog synthesis signal to the first signal synthesis module; and the first signal synthesis module is configured to cancel, according to the first analog synthesis signal, the self-interference signal in the analog receive signal received by the receive antenna, to remove the linear part of the self-interference signal from the analog receive signal.

With reference to the foregoing possible implementation manners, in a fourth possible implementation manner of the first aspect, the device further includes: a third self-interference cancellation unit, where the third self-interference cancellation unit is configured to: obtain a third analog signal by coupling the first analog synthesis signal;

perform analog-to-digital conversion on the third analog signal, to obtain a third digital signal;

perform interference reconstruction according to the third digital signal, to obtain a third digital interference cancellation signal; and cancel a self-interference signal in the first output signal according to the third digital interference cancellation signal, to obtain a second output signal, and output the second output signal to the digital receive processing module.

With reference to the foregoing possible implementation manner, in a fifth possible implementation manner of the first aspect, the third self-interference cancellation unit includes: a second signal coupling module, a third analog-to-digital conversion module, and a third digital interference reconstruction module, where the second signal coupling module is configured to obtain the third analog signal by coupling the first analog synthesis signal, and output the third analog signal to the third analog-to-digital conversion module;

the third analog-to-digital conversion module is configured to perform analog-to-digital conversion on the third analog signal, to obtain the third digital signal, and output the third digital signal to the third digital interference reconstruction module; and the third digital interference reconstruction module is configured to perform interference reconstruction according to the third digital signal, to obtain the third digital interference cancellation signal, and output the third digital interference cancellation signal to the first digital interference cancellation module, where correspondingly, the first digital interference cancellation module is further configured to cancel the self-interference signal in the first output signal according to the third digital interference cancellation signal, to obtain the second output signal, and output the second output signal to the digital receive processing module.

With reference to the foregoing possible implementation manners, in a sixth possible implementation manner of the first aspect, the first digital interference reconstruction module is configured to: process the first digital signal according to the digital transmit signal output by the digital transmit processing module, to remove a digital transmit signal part from the first digital signal; and perform interference reconstruction on the processed first digital signal, to obtain the first digital interference cancellation signal, and output the first digital interference cancellation signal to the first digital interference cancellation module.

With reference to the foregoing possible implementation manner, in a seventh possible implementation manner of the first aspect, the third digital interference reconstruction module is configured to: process the third digital signal according to the digital transmit signal output by the digital transmit processing module, to remove a digital transmit signal part from the third digital signal; and perform interference reconstruction according to the third digital signal from which the digital transmit signal part is removed, to obtain the third digital interference cancellation signal, and output the third digital interference cancellation signal to the first digital interference cancellation module.

With reference to the foregoing possible implementation manners, in an eighth possible implementation manner of the first aspect, the second analog-to-digital conversion module includes: a first analog feedback processing submodule and a second analog-to-digital conversion submodule, where the first analog feedback processing submodule is configured to process the first analog signal output by the first signal coupling module, to obtain a second analog signal, and output the second analog signal to the second analog-to-digital conversion submodule; and the second analog-to-digital conversion submodule is configured to perform analog-to-digital conversion on the second analog signal output by the first analog feedback processing submodule, to obtain the first digital signal, and output the first digital signal to the first digital interference reconstruction module.

With reference to the foregoing possible implementation manner, in a ninth possible implementation manner of the first aspect, the first analog feedback processing submodule includes: a first filter and a first down-converter, where the first filter is configured to perform filtering processing on the first analog signal, to obtain a first filtered analog signal, and output the first filtered analog signal to the first down-converter; and the first down-converter is configured to down-convert the first filtered analog signal, to obtain the second analog signal, and output the second analog signal to the second analog-to-digital conversion submodule.

With reference to the foregoing possible implementation manners, in a tenth possible implementation manner of the first aspect, the second digital-to-analog conversion module includes: a second digital-to-analog conversion submodule and a first reconstruction analog processing submodule, where the second digital-to-analog conversion submodule is configured to perform digital-to-analog conversion on the second digital interference cancellation signal, to obtain a second analog interference cancellation signal, and output the second analog interference cancellation signal to the first reconstruction analog processing submodule; and the first reconstruction analog processing submodule is configured to process the second analog interference cancellation signal output by the second digital-to-analog conversion submodule, to obtain the first analog synthesis signal, and output the first analog synthesis signal to the first signal synthesis module.

With reference to the foregoing possible implementation manner, in an eleventh possible implementation manner of the first aspect, the first reconstruction analog processing submodule includes: a first up-converter and a first gain amplifier, where the first up-converter is configured to up-convert the second digital interference cancellation signal, to obtain a first up-converted analog signal, and output the first up-converted analog signal to the first gain amplifier; and the first gain amplifier is configured to perform amplification processing on the first up-converted analog signal, to obtain the first analog synthesis signal, and output the first analog synthesis signal to the first signal synthesis module.

With reference to the foregoing possible implementation manners, in a twelfth possible implementation manner of the first aspect, the third analog-to-digital conversion module includes: a second analog feedback processing submodule and a third analog-to-digital conversion submodule, where the second analog feedback processing submodule is configured to process the third analog signal, to obtain a fourth analog signal, and output the fourth analog signal to the third analog-to-digital conversion submodule; and the third analog-to-digital conversion submodule is configured to perform analog-to-digital conversion on the third analog signal output by the second analog feedback processing submodule, to obtain the third digital signal, and output the third digital signal to the third digital interference reconstruction module.

With reference to the foregoing possible implementation manner, in a thirteenth possible implementation manner of the first aspect, the second analog feedback processing submodule includes: a second filter and a second down-converter, where the second filter is configured to perform filtering processing on the third analog signal, to obtain a second filtered analog signal, and output the second filtered analog signal to the second down-converter; and the second down-converter is configured to perform down-conversion processing on the second filtered analog signal, to obtain the fourth analog signal, and output the fourth analog signal to the third analog-to-digital conversion submodule.

According to a second aspect, a self-interference signal cancellation method is provided, applicable to a communications device, where the device includes: a digital transmit processing module, an analog transmit processing module, a first analog-to-digital conversion module, an analog receive processing module, and a digital receive processing module, where a transmit signal output by the analog transmit processing module is transmitted through an air interface to the first analog-to-digital conversion module, forming a self-interference signal, and a digital signal output by the first analog-to-digital conversion module includes the self-interference signal; and the method includes:

obtaining a first analog signal by coupling the transmit signal output by the analog transmit processing module;

performing analog-to-digital conversion on the first analog signal, to obtain a first digital signal;

performing interference reconstruction according to the first digital signal, to obtain a first digital interference cancellation signal; and canceling, according to the first digital interference cancellation signal, the self-interference signal included in the digital signal output by the first analog-to-digital conversion module, to obtain a first output signal, and outputting the first output signal to the digital receive processing module.

With reference to the second aspect, in a first possible implementation manner of the second aspect, the method further includes:

performing interference reconstruction according to a digital transmit signal output by the digital transmit processing module, to obtain a second digital interference cancellation signal;

performing digital-to-analog conversion on the second digital interference cancellation signal, to obtain a first analog synthesis signal;

canceling, according to the first analog synthesis signal, a self-interference signal in an analog receive signal received by the receive antenna, to remove a linear part of the self-interference signal from the analog receive signal; and outputting a signal obtained through the cancellation to the analog receive processing module.

With reference to the foregoing possible implementation manner, in a second possible implementation manner of the second aspect, the method further includes:

obtaining a third analog signal by coupling the first analog synthesis signal;

performing analog-to-digital conversion on the third analog signal, to obtain a third digital signal;

performing interference reconstruction according to the third digital signal, to obtain a third digital interference cancellation signal; and canceling a self-interference signal in the first output signal according to the third digital interference cancellation signal, to obtain a second output signal, and outputting the second output signal to the digital receive processing module.

With reference to the foregoing possible implementation manners, in a third possible implementation manner of the second aspect, the method further includes:

processing the first digital signal according to the digital transmit signal output by the digital transmit processing module, to remove a digital transmit signal part from the first digital signal; and performing interference reconstruction on the processed first digital signal, to obtain the first digital interference cancellation signal, and outputting the first digital interference cancellation signal to the first digital interference cancellation module.

With reference to the foregoing possible implementation manner, in a fourth possible implementation manner of the second aspect, the method further includes:

processing the third digital signal according to the digital transmit signal output by the digital transmit processing module, to remove a digital transmit signal part from the third digital signal; and performing interference reconstruction according to the third digital signal from which the digital transmit signal part is removed, to obtain the third digital interference cancellation signal, and outputting the third digital interference cancellation signal to the first digital interference cancellation module.

With reference to the foregoing possible implementation manners, in a fifth possible implementation manner of the second aspect, the performing analog-to-digital conversion on the first analog signal, to obtain a first digital signal includes:

processing the first analog signal, to obtain a second analog signal; and performing analog-to-digital conversion on the second analog signal, to obtain the first digital signal.

With reference to the foregoing possible implementation manner, in a sixth possible implementation manner of the second aspect, the processing the first analog signal, to obtain a second analog signal includes:

performing filtering processing on the first analog signal, to obtain a first filtered analog signal; and down-converting the first filtered analog signal, to obtain the second analog signal.

With reference to the foregoing possible implementation manners, in a seventh possible implementation manner of the second aspect, the performing digital-to-analog conversion on the second digital interference cancellation signal, to obtain a first analog synthesis signal includes:

performing digital-to-analog conversion on the second digital interference cancellation signal, to obtain a second analog interference cancellation signal; and processing the second analog interference cancellation signal output by the second digital-to-analog conversion submodule, to obtain the first analog synthesis signal.

With reference to the foregoing possible implementation manner, in an eighth possible implementation manner of the second aspect, the processing the second analog interference cancellation signal output by the second digital-to-analog conversion submodule, to obtain the first analog synthesis signal includes:

up-converting the second digital interference cancellation signal, to obtain a first up-converted analog signal; and performing amplification processing on the first up-converted analog signal, to obtain the first analog synthesis signal.

With reference to the foregoing possible implementation manner, in a ninth possible implementation manner of the second aspect, the performing analog-to-digital conversion on the third analog signal, to obtain a third digital signal includes:

processing the third analog signal, to obtain a fourth analog signal; and performing analog-to-digital conversion on the third analog signal output by the second analog feedback processing submodule, to obtain the third digital signal.

With reference to the foregoing possible implementation manner, in a tenth possible implementation manner of the second aspect, the processing the third analog signal, to obtain a fourth analog signal includes:

performing filtering processing on the third analog signal, to obtain a second filtered analog signal; and performing down-conversion processing on the second filtered analog signal, to obtain the fourth analog signal.

According to the device and method provided in the embodiments of the present invention, a first self-interference cancellation unit is added, a first analog signal is obtained by coupling a transmit signal of an analog transmit processing module, the first analog signal is converted into a first digital signal, interference reconstruction is performed according to the first digital signal to obtain a first digital interference cancellation signal, and a self-interference signal included in a digital signal output by a first analog-to-digital conversion module is canceled according to the first digital interference cancellation signal to obtain a first output signal. Because the first analog signal is obtained by coupling the transmit signal, the first digital interference cancellation signal finally obtained according to the first analog signal includes a linear part, a non-linear part, a noise part, and the like of the self-interference signal; therefore, after interference cancellation is performed by using the first digital interference cancellation signal and the digital signal output by the first analog-to-digital conversion module, a self-interference signal introduced during transmission can be canceled.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Figure 1A:
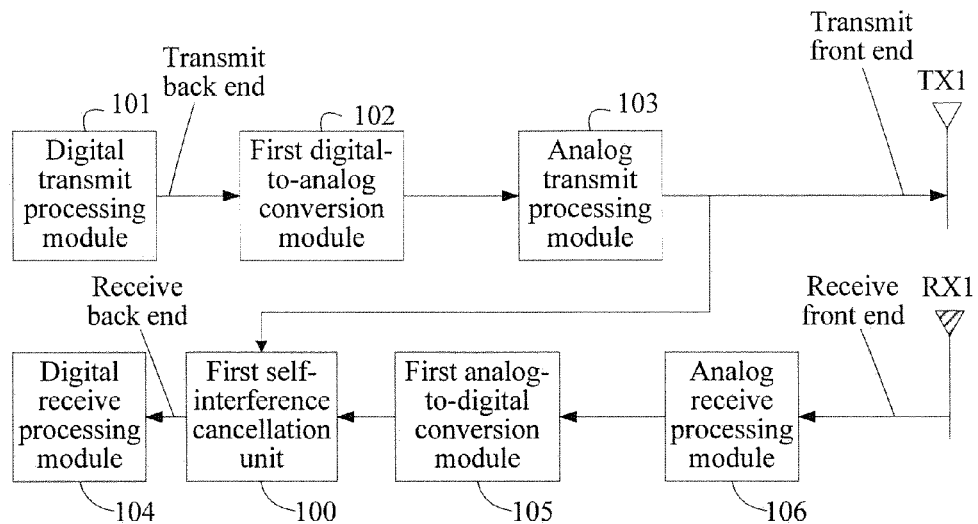
FIG. 1a is a schematic structural diagram of a self-interference signal cancellation device according to an embodiment of the present invention.

FIG. 1a is a schematic structural diagram of a self-interference signal cancellation device according to an embodiment of the present invention. Referring to FIG. 1a, the device includes: a digital transmit processing module 101, an analog transmit processing module 103, a digital receive processing module 104, a first analog-to-digital conversion module 105, and an analog receive processing module 106. A transmit signal output by the analog transmit processing module 103 is transmitted through an air interface to the first analog-to-digital conversion module 105, forming a self-interference signal, a digital signal output by the first analog-to-digital conversion module 105 includes the self-interference signal, and the device further includes: a first self-interference cancellation unit 100.

The first self-interference cancellation unit 100 is configured to: obtain a first analog signal by coupling the transmit signal output by the analog transmit processing module; perform analog-to-digital conversion on the first analog signal, to obtain a first digital signal; perform interference reconstruction according to the first digital signal, to obtain a first digital interference cancellation signal; and cancel, according to the first digital interference cancellation signal, the self-interference signal included in the digital signal output by the first analog-to-digital conversion module, to obtain a first output signal, and output the first output signal to the digital receive processing module.

It should be noted that, in this embodiment of the present invention, it is only defined that a self-interference signal is used to represent a component of the self-interference signal, and a signal form of the self-interference signal is the same as a signal that carries the component; for example, "the self-interference signal included in the digital signal" described above refers to a self-interference signal component that is included in the digital signal, and in this case, the signal form of the self-interference signal is digital signal.

In the prior art, an analog transmit processing module and the like at a transmit end may produce some distortions (such as a phase noise introduced by frequency mixing, or non-linearity and a noise floor that are introduced by a power amplifier) in analog signals that undergo digital-to-analog conversion, and when transmitted by using an antenna, these distorted signals are leaked to a receive end. However, linear modeling directly performed on a digital signal that is before digital-to-analog conversion cannot reconstruct these impacts, and even if non-linear modeling is performed, the phase noise or noise floor cannot be reconstructed; therefore, interference cancellation performance is poor.

According to the device provided in this embodiment of the present invention, a first self-interference cancellation unit is added, a first analog signal is obtained by coupling a transmit signal of an analog transmit processing module, the first analog signal is converted into a first digital signal, interference reconstruction is performed according to the first digital signal to obtain a first digital interference cancellation signal, and a self-interference signal included in a digital signal output by a first analog-to-digital conversion module is canceled according to the first digital interference cancellation signal to obtain a first output signal. Because the first analog signal is obtained by coupling the transmit signal, the first digital interference cancellation signal finally obtained according to the first analog signal includes a linear part, a non-linear part, a noise part, and the like of the self-interference signal; therefore, after interference cancellation is performed by using the first digital interference cancellation signal and the digital signal output by the first analog-to-digital conversion module, a self-interference signal introduced during transmission can be canceled.

Figure 1B:
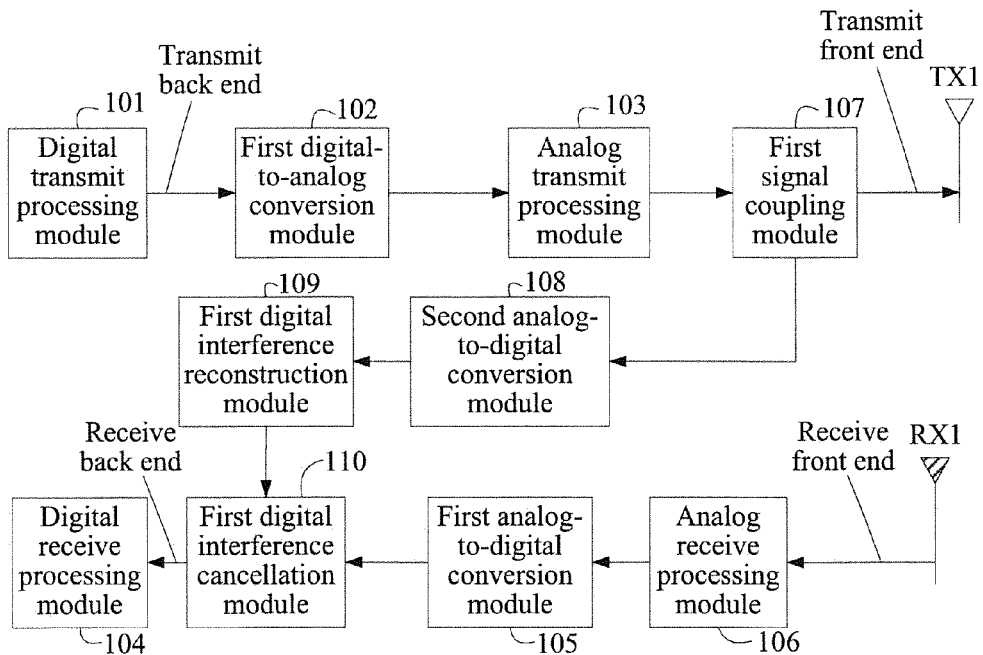
FIG. 1b is a schematic structural diagram of a self-interference signal cancellation device according to an embodiment of the present invention.

FIG. 1b is a schematic structural diagram of a self-interference signal cancellation device according to an embodiment of the present invention. Referring to FIG. 1b, the device includes: a digital transmit processing module 101, a first digital-to-analog conversion module 102, an analog transmit processing module 103, a transmit antenna TX1; a receive channel includes: a digital receive processing module 104, a first analog-to-digital conversion module 105, an analog receive processing module 106, a receive antenna RX1, and a first self-interference cancellation unit 100. A transmit signal output by the analog transmit processing module 103 is transmitted through an air interface to the first analog-to-digital conversion module 105, forming a self-interference signal, and a digital signal output by the first analog-to-digital conversion module 105 includes the self-interference signal.

The first self-interference cancellation unit 100 includes: a first signal coupling module 107, a second analog-to-digital conversion module 108, a first digital interference reconstruction module 109, and a first digital interference cancellation module 110, where the first signal coupling module 107 is configured to obtain a first analog signal by coupling the transmit signal output by the analog transmit processing module 103 on a transmit channel, and output the first analog signal to the second analog-to-digital conversion module 108;

the second analog-to-digital conversion module 108 is configured to perform analog-to-digital conversion on the first analog signal, to obtain a first digital signal, and output the first digital signal to the first digital interference reconstruction module 109;

the first digital interference reconstruction module 109 is configured to perform interference reconstruction according to the first digital signal, to obtain a first digital interference cancellation signal, and output the first digital interference cancellation signal to the first digital interference cancellation module 110; and the first digital interference cancellation module 110 is configured to perform, according to the first digital interference cancellation signal, interference cancellation on a digital signal demodulated by the receive channel, to obtain a first output signal, and output the first output signal to the analog receive processing module 106.

According to the device provided in this embodiment of the present invention, a first self-interference cancellation unit is added, a first analog signal is obtained by coupling a transmit signal of an analog transmit processing module, the first analog signal is converted into a first digital signal, interference reconstruction is performed according to the first digital signal to obtain a first digital interference cancellation signal, and a self-interference signal included in a digital signal output by a first analog-to-digital conversion module is canceled according to the first digital interference cancellation signal to obtain a first output signal. Because the first analog signal is obtained by coupling the transmit signal, the first digital interference cancellation signal finally obtained according to the first analog signal includes a linear part, a non-linear part, a noise part, and the like of the self-interference signal; therefore, after interference cancellation is performed by using the first digital interference cancellation signal and the digital signal output by the first analog-to-digital conversion module, a self-interference signal introduced during transmission can be canceled.

Figure 2A:
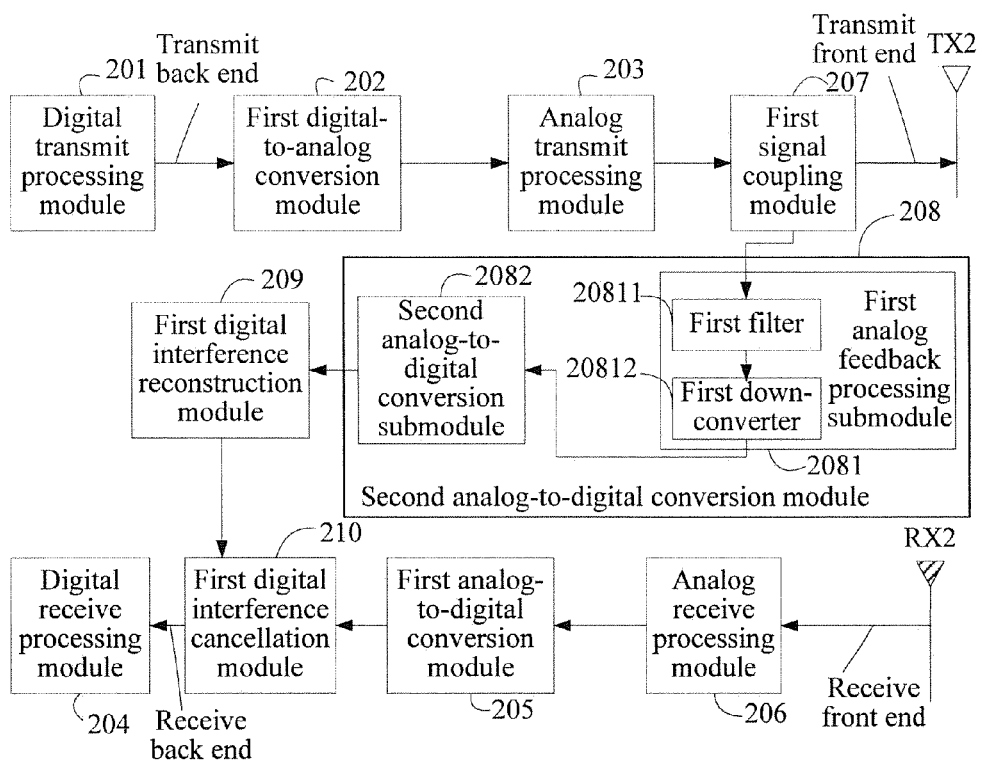
FIG. 2a is a schematic structural diagram of a self-interference signal cancellation device according to an embodiment of the present invention.

FIG. 2a is a schematic structural diagram of a self-interference signal cancellation device according to an embodiment of the present invention. The device may be applied to a common superheterodyne receiver architecture. Referring to FIG. 2a, the device includes: a digital transmit processing module 201, a first digital-to-analog conversion module 202, an analog transmit processing module 203, a transmit antenna TX2, a digital receive processing module 204, a first analog-to-digital conversion module 205, an analog receive processing module 206, and a receive antenna RX2.

Specifically, in an actual application, the digital transmit processing module 201 on a transmit channel is generally implemented by using a transmitter, and is configured to generate a digital transmit signal, and output the digital transmit signal to the first digital-to-analog conversion module 202; the first digital-to-analog conversion module 202 may generally be implemented by using a digital-to-analog converter, and is configured to perform digital-to-analog conversion on the digital transmit signal, to obtain an analog transmit signal that corresponds to the digital transmit signal, and output the analog transmit signal to the analog transmit processing module 203; the analog transmit processing module 203 is generally implemented by using a frequency converter and a power amplifier, and is configured to perform processing, such as frequency conversion and power amplification, on the analog transmit signal, to obtain a transmit signal, and transmit the transmit signal by using the transmit antenna TX2.

Further, in an actual application, the receive antenna RX2 is configured to receive an analog signal. Because parameters of the analog signal received by the receive antenna are uncontrollable, the analog receive processing module 206 may be implemented by using a low-noise amplifier, a filter, and a frequency converter, and is configured to perform processing, such as low-noise amplification, filtering, and frequency conversion, on an analog receive signal received by the receive antenna RX2, and output the processed analog signal to the first analog-to-digital conversion module 205; the first analog-to-digital conversion module 205 is generally implemented by using an analog-to-digital converter, and is configured to convert the analog signal, on which the analog receive processing module 206 has performed the processing such as low-noise amplification, filtering, and frequency conversion, into a digital signal, and the digital signal is received by the digital receive processing module 204, where the digital receive processing module 204 on a receive channel is generally implemented by using a receiver.

The device further includes a first self-interference cancellation unit, where the first self-interference cancellation unit is configured to cancel a self-interference signal in a receive signal, and the self-interference signal may include a linear part, a non-linear part, and a noise part, where the linear part is introduced by the digital transmit signal on the transmit channel of the device, and the non-linear part and the noise part are introduced by the transmit channel.

Specifically, the first self-interference cancellation unit includes: a first signal coupling module 207, a second analog-to-digital conversion module 208, a first digital interference reconstruction module 209, and a first digital interference cancellation module 210.

The modules included in the first self-interference cancellation unit are separately introduced below:

(1) The first signal coupling module 207:

One end of the first signal coupling module 207 is connected to the analog transmit processing module 203 on the transmit channel, and the other end is connected to the second analog-to-digital conversion module 208. The first signal coupling module 207 is configured to obtain a first analog signal by coupling the transmit signal output by the analog transmit processing module 203 on the transmit channel, output the first analog signal to the second analog-to-digital conversion module 208, and output the remaining part of the transmit signal to the transmit antenna TX2 for transmission. In this case, the first analog signal output by the first signal coupling module 207 to the second analog-to-digital conversion module 208 includes a linear part, a non-linear part, and a noise part.

In an actual application, the first signal coupling module 207 may be implemented by using a coupler.

It should be noted that the first analog signal is a partial analog signal that is obtained by the first signal coupling module 207 by coupling the transmit signal output by the analog transmit processing module 203. During processing by the first signal coupling module 207, the transmit signal output by the analog transmit processing module 203 may be divided into two parts according to a preset coupling parameter of the first signal coupling module 207, where one part is used for interference reconstruction, and the other part is used to be output to a transmit front end for transmission.

(2) The second analog-to-digital conversion module 208 includes that:

One end of the second analog-to-digital conversion module 208 is connected to the first signal coupling module 207, and the other end is connected to the first digital interference reconstruction module 209. The second analog-to-digital conversion module 208 is configured to perform analog-to-digital conversion on the first analog signal, to obtain a first digital signal, and output the first digital signal to the first digital interference reconstruction module 209.

Specifically, the second analog-to-digital conversion module 208 includes: a first analog feedback processing submodule 2081 and a second analog-to-digital conversion submodule 2082. The first analog feedback processing submodule 2081 is configured to process the first analog signal output by the first signal coupling module 207, to obtain a second analog signal, and output the second analog signal to the second analog-to-digital conversion submodule 2082. The second analog-to-digital conversion submodule 2082 is configured to perform analog-to-digital conversion on the second analog signal output by the first analog feedback processing submodule 2081, to obtain the first digital signal, and output the first digital signal to the first digital interference reconstruction module 209.

(2.1) One end of the first analog feedback processing submodule 2081 is connected to the first signal coupling module 207, and the other end is connected to the second analog-to-digital conversion submodule 2082. The first analog feedback processing submodule 2081 is configured to process the first analog signal output by the first signal coupling module 207, to obtain the second analog signal, and output the second analog signal to the second analog-to-digital conversion submodule 2082.

Processing performed by the first analog feedback processing submodule 2081 includes, but is not limited to, filtering and frequency conversion on the analog signal. Specifically, the first analog feedback processing submodule 2081 includes: a first filter 20811 and a first down-converter 20812. In an actual application, the first filter 20811 may be implemented by using a filter, and the first down-converter 20812 may be implemented by using a frequency converter and a local oscillator. The first filter 20811 and the first down-converter 20812 are separately described below:

(2.1.1) The first filter 20811 is configured to receive the first analog signal output by the first signal coupling module 207, perform filtering processing on the first analog signal to obtain a first filtered analog signal, and output the first filtered analog signal to the first down-converter 20812. An objective of the filtering is to filter out an undesired signal out of a preset frequency in the first analog signal, to obtain the first filtered analog signal whose frequency is a first preset frequency.

(2.1.2) The first down-converter 20812 is configured to down-convert the first filtered analog signal output by the first filter 20811 to obtain a first down-converted analog signal, and output the first down-converted analog signal to the second analog-to-digital conversion submodule 2082. An objective of the down-conversion is to perform, by using a frequency converter, frequency conversion on a local oscillator frequency generated by a local oscillator and the first filtered analog signal, to obtain the first down-converted analog signal whose frequency is a second preset frequency.

In an actual application, because a signal-to-noise ratio is generally low on the receive channel and a signal is usually much smaller than an interference signal, if a common amplifier is used, the signal and the interference signal are both amplified, which is not beneficial to subsequent processing. Therefore, before the first filter 20811 performs filtering, low-noise amplification is first performed on the first analog signal output by the first signal coupling module 207. Therefore, based on the foregoing structure, the first analog feedback processing submodule 2081 further includes: a first low-noise amplifier, where the low-noise amplifier may be located between the first filter 20811 and the first signal coupling module 207; one end of the low-noise amplifier is connected to the first signal coupling module 207, and the other end is connected to the first filter 20811; the low-noise amplifier is configured to perform low-noise amplification on the first analog signal output by the first signal coupling module 207, to obtain a first amplified analog signal, and output the first amplified analog signal to the first filter 20811, so that after the first filter 20811 performs filtering on the received signal, the first filter 20811 obtains the first filtered analog signal and outputs the first filtered analog signal to the first down-converter 20812. In an actual application, the first low-noise amplifier may be implemented by using a low-noise amplifier that can suppress an interference signal.

It should be noted that the foregoing first preset frequency and second preset frequency both match actual parameters of the device, and may be adjusted according to changes in the actual parameters of the device, which is not specifically limited in this embodiment of the present invention.

(2.2) The second analog-to-digital conversion submodule 2082:

One end of the second analog-to-digital conversion submodule 2082 is connected to the first analog feedback processing submodule 2081, and the other end is connected to the first digital interference reconstruction module 209. The second analog-to-digital conversion submodule 2082 is configured to perform analog-to-digital conversion on the second analog signal output by the first analog feedback processing submodule 2081, to obtain the first digital signal, and output the first digital signal to the first digital interference reconstruction module 209.

In an actual application, the second analog-to-digital conversion submodule 2082 may be implemented by using an analog-to-digital converter.

(3) The first digital interference reconstruction module 209:

One end of the first digital interference reconstruction module 209 is connected to the second analog-to-digital conversion module 208, and the other end is connected to the first digital interference cancellation module 210. The first digital interference reconstruction module 209 is configured to perform interference reconstruction according to the first digital signal, to obtain a first digital interference cancellation signal, and output the first digital interference cancellation signal to the first digital interference cancellation module 210. In this case, the first digital interference cancellation signal includes the linear part, the non-linear part, and the noise part of the self-interference signal.

In an actual application, the first digital interference reconstruction module 209 is mainly configured to reconstruct the self-interference signal on the transmit channel, and the interference reconstruction may be implemented by means of training or adaptation. Specifically, during the interference reconstruction, the first digital interference cancellation signal may be obtained by performing amplitude modulation, frequency conversion, and phase modulation on the first digital signal, so that the first digital interference cancellation signal and the interference signal that is on the receive channel and introduced from the transmit channel have a same amplitude value and frequency, and have a phase difference of 180 degrees, so that the first digital interference cancellation signal can be used to cancel the interference signal that is on the receive channel and introduced from the transmit channel.

(4) The first digital interference cancellation module 210:

The first digital interference cancellation module 210 includes two inputs and one output, and the first digital interference cancellation module 210 receives the first digital interference cancellation signal output by the first digital interference reconstruction module 209 and the digital signal on the receive channel and output by the first analog-to-digital conversion module 205. The first digital interference cancellation module 210 is configured to cancel, according to the first digital interference cancellation signal, the self-interference signal included in the digital signal output by the first analog-to-digital conversion module, to obtain the first output signal, and output the first output signal to the digital receive processing module 204.

Because the first digital interference cancellation signal includes the linear part, the non-linear part, and the noise part of the self-interference signal, that is, the first digital interference cancellation signal already includes a signal distortion introduced by the transmit channel, a distorted signal leaked to the receive channel can also be canceled by means of cancellation, which greatly improves performance of digital cancellation.

For example, it is assumed that the digital transmit signal output by the digital transmit processing module 201 is $X[k]$, after the digital transmit signal is processed by the first digital-to-analog conversion module 202 and the analog transmit processing module 203, the non-linear part and noise part $N[t]$ of the self-interference signal are introduced, an obtained transmit signal is $X[t]+N[t]$, and a receive signal at a receive front end includes the part of the self-interference signal $H[t]*(X[t]+N[t])$ and a pre-receive signal $S[t]$, where $X[t]$ is an analog signal that corresponds to $X[k]$, a digital signal that corresponds to $N[t]$ is $N[k]$, $S[t]$ is a pre-receive signal desired by a receiver, and a digital signal that corresponds to $S[t]$ is $S[k]$. In the first self-interference cancellation unit, a first analog signal that is obtained by the first signal coupling module 207 by coupling the transmit signal is $X[t]+N[t]$; a corresponding digital signal, that is, a first digital signal $X[k]+N[k]$, is obtained after the first analog signal is processed by the first analog feedback processing submodule 2081 and the second analog-to-digital conversion submodule 2082; the first digital interference reconstruction module 209 performs interference reconstruction on the first digital signal, to obtain a first digital interference cancellation signal $-H[k]*(X[k]+N[k])$. On the receive channel, a digital receive signal obtained after a receive signal $H[t]*(X[t]+N[t])+S[t]$ is processed by the analog receive processing module 206 and the first analog-to-digital conversion module 205 is $H[k]*(X[k]+N[k])+S[k]$; the first digital interference cancellation module 210 includes two inputs and one output, where the two inputs are the first digital interference cancellation signal $-H[k]*(X[k]+N[k])$ and the digital receive signal $H[k]*(X[k]+N[k])+S[k]$; a first output signal obtained after the first digital interference cancellation module 210 cancels the two input signals is $S[k]$. It can be seen that the linear part introduced by the digital transmit signal and the non-linear part and the noise part that are introduced by the transmit channel, in the self-interference signal, are removed.

In addition, in another embodiment provided in the embodiments of the present invention, when the transmit channel further includes a DPD (Digital Pre-Distortion, digital pre-distortion) feedback channel, because the DPD feedback channel generally includes the first signal coupling module, the first analog feedback processing module, the second analog-to-digital conversion module, and the like that are described above, the first self-interference cancellation unit may further include only the first digital interference reconstruction module 209 and the first digital interference cancellation module 210, where one end of the first digital interference reconstruction module 210 is connected to the second analog-to-digital conversion module on the DPD feedback channel, and the other end is connected to the first digital interference cancellation module 210. The first digital interference reconstruction module 209 is configured to perform interference reconstruction according to a digital signal on the DPD feedback channel, to obtain a first digital interference cancellation signal, and output the first digital interference cancellation signal to the first digital interference cancellation module 210.

This solution is not only applicable to an LTE (Long Term Evolution, Long Term Evolution) device, but also is applicable to a WCDMA (Wideband Code Division Multiple Access, Wideband Code Division Multiple Access) device, a TD-SCDMA (Time Division-Synchronous Code Division Multiple Access, Time Division-Synchronous Code Division Multiple Access) device, and a WiMax (Worldwide Interoperability for Microwave Access, Worldwide Interoperability for Microwave Access) device.

According to the device provided in this embodiment of the present invention, a first self-interference cancellation unit is added, a first analog signal is obtained by coupling a transmit signal of an analog transmit processing module, the first analog signal is converted into a first digital signal, interference reconstruction is performed according to the first digital signal to obtain a first digital interference cancellation signal, and a self-interference signal included in a digital signal output by a first analog-to-digital conversion module is canceled according to the first digital interference cancellation signal to obtain a first output signal. Because the first analog signal is obtained by coupling the transmit signal, the first digital interference cancellation signal finally obtained according to the first analog signal includes a linear part, a non-linear part, a noise part, and the like of the self-interference signal; therefore, after interference cancellation is performed by using the first digital interference cancellation signal and the digital signal (including the self-interference signal and a signal desired by a remote end) output by the first analog-to-digital conversion module, the signal desired by the remote end is obtained, and a self-interference signal introduced during transmission can be canceled.

Figure 2B:
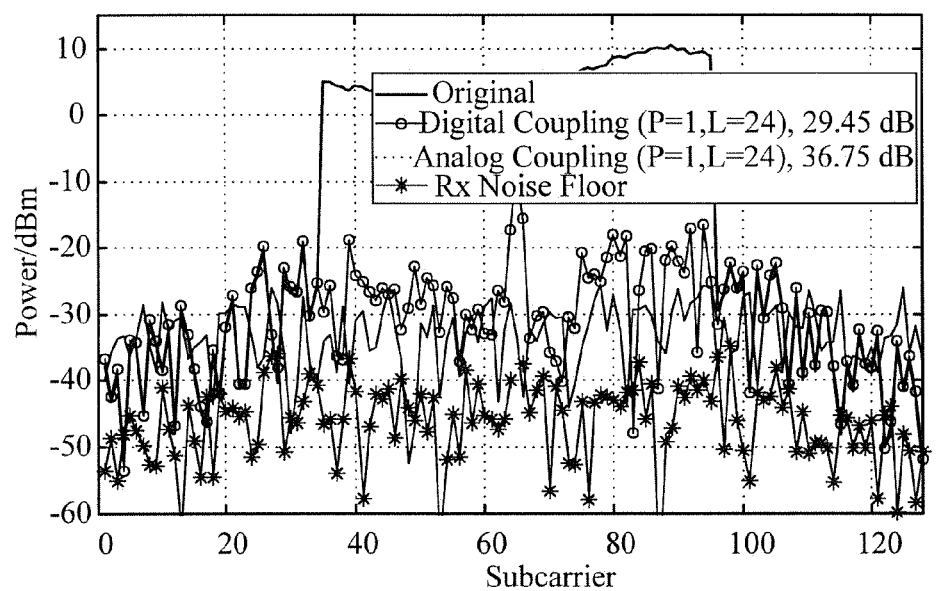
FIG. 2b is a diagram of comparison between an embodiment of the present invention and a traditional digital domain coupling cancellation method.

FIG. 2b is a diagram of comparison between an embodiment of the present invention and a traditional digital domain coupling cancellation method, where a solid line is an original receive self-interference signal, a solid line with circles is a signal on which digital coupling self-interference cancellation is performed, a dotted line is a result of this solution, that is, a signal on which analog coupling digital cancellation on a radio frequency channel is performed, and a solid line with asterisks is a receiver noise floor. The signals herein are all frequency domain signals, reflected on different subcarriers.

It can be learned from the figure that performance of an analog coupling manner is obviously better than that of a digital coupling cancellation method, and a result shows that a cancellation capability is improved by about 7.3 dB.

Figure 3:
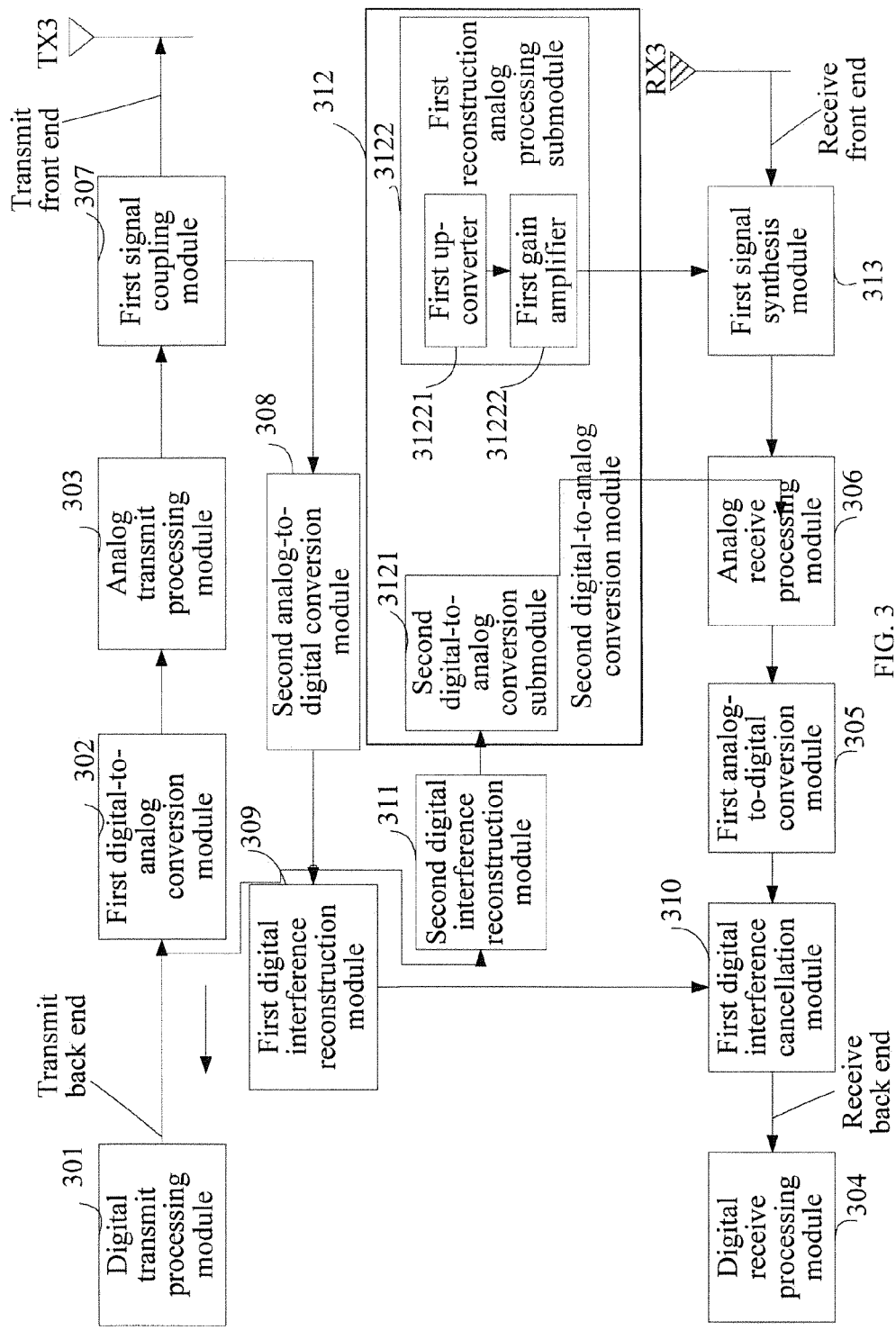
FIG. 3 is a schematic structural diagram of a self-interference signal cancellation device according to an embodiment of the present invention.

To cancel a self-interference signal in a receive signal to a greater extent, another self-interference cancellation device is provided. Referring to FIG. 3, FIG. 3 is a schematic structural diagram of another self-interference signal cancellation device according to an embodiment of the present invention. Based on the embodiment in FIG. 2a, a second self-interference cancellation unit is added to the self-interference cancellation device. All parts of the self-interference cancellation device are described below:

The device includes: a digital transmit processing module 301, a first digital-to-analog conversion module 302, an analog transmit processing module 303, a transmit antenna TX3, a digital receive processing module 304, a first analog-to-digital conversion module 305, an analog receive processing module 306, and a receive antenna RX3.

Specific implementations of the foregoing modules are similar to the implementations of the modules in the embodiment shown in FIG. 2a, which are not described again in this embodiment of the present invention.

The device further includes a first self-interference cancellation unit. The first self-interference cancellation unit includes: a first signal coupling module 307, a second analog-to-digital conversion module 308, a first digital interference reconstruction module 309, and a first digital interference cancellation module 310.

A specific implementation of the first self-interference cancellation unit is similar to the implementation of the first self-interference cancellation unit in the embodiment shown in FIG. 2a, and a difference lies in that the first digital interference reconstruction module 309 has two inputs and one output, where the two inputs of the first digital interference reconstruction module 309 are the digital transmit processing module 301 and the second analog-to-digital conversion module 308, and the one output is the first digital interference cancellation module 310.

The first digital interference reconstruction module 309 is configured to: process a first digital signal according to a digital transmit signal output by the digital transmit processing module 301, to remove a linear part, which is introduced by the digital transmit signal, of a self-interference signal from the first digital signal; and perform interference reconstruction on the processed first digital signal, to obtain a first digital interference cancellation signal, and output the first digital interference cancellation signal to the first digital interference cancellation module 310.

It should be noted that the digital transmit signal output by the digital transmit processing module 301 is a linear part that interferes with a receive channel, while the first digital signal output by the second analog-to-digital conversion module 308 includes the linear part, a non-linear part, and a noise part of the self-interference signal. Because an objective of introducing the second self-interference cancellation unit is to remove, at a receive front end, impact of the linear part of the self-interference signal on a receive signal, in order to prevent additional cancellation at a receive back end, the linear part of the self-interference signal needs to be first removed from the first digital signal before interference cancellation is performed. Therefore, the digital transmit signal output by the digital transmit processing module 301 is introduced.

The device further includes: a second self-interference cancellation unit. The second self-interference cancellation unit is configured to: perform interference reconstruction according to the digital transmit signal output by the digital transmit processing module, to obtain a second digital interference cancellation signal; perform digital-to-analog conversion on the second digital interference cancellation signal, to obtain a first analog synthesis signal; synthesize the first analog synthesis signal and an analog receive signal received by the receive antenna, to remove the linear part of the self-interference signal from the analog receive signal; and output a signal obtained through the synthesis to the analog receive processing module.

Specifically, the second self-interference cancellation unit includes: a second digital interference reconstruction module 311, a second digital-to-analog conversion module 312, and a first signal synthesis module 313.

One end of the second digital interference reconstruction module 311 is connected to the digital transmit processing module 301, and the other end is connected to the second digital-to-analog conversion module 312. The second digital interference reconstruction module 311 is configured to perform interference reconstruction according to the digital transmit signal output by the digital transmit processing module 301, to obtain the second digital interference cancellation signal, and output the second digital interference cancellation signal to the second digital-to-analog conversion module 312. In this case, the second digital interference cancellation signal includes the linear part of the self-interference signal.

One end of the second digital-to-analog conversion module 312 is connected to the second digital interference reconstruction module 311, and the other end is connected to the first signal synthesis module 313. The second digital-to-analog conversion module 312 is configured to perform digital-to-analog conversion on the second digital interference cancellation signal, to obtain the first analog synthesis signal, and output the first analog synthesis signal to the first signal synthesis module 313.

Specifically, the second digital-to-analog conversion module 312 includes: a second digital-to-analog conversion submodule 3121 and a first reconstruction analog processing submodule 3122.

One end of the second digital-to-analog conversion submodule 3121 is connected to the second digital interference reconstruction module 311, and the other end is connected to the first reconstruction analog processing submodule 3122. The second digital-to-analog conversion submodule 3121 is configured to perform digital-to-analog conversion on the second digital interference cancellation signal, to obtain a second analog interference cancellation signal, and output the second analog interference cancellation signal to the first reconstruction analog processing submodule 3122. In an actual application, the second digital-to-analog conversion submodule 3121 may be implemented by using a digital-to-analog converter.

One end of the first reconstruction analog processing submodule 3122 is connected to the second digital-to-analog conversion submodule 3121, and the other end is connected to the first signal synthesis module 313. The first reconstruction analog processing submodule 3122 is configured to process the second analog interference cancellation signal, to obtain a first analog synthesis signal, and output the first analog synthesis signal to the first signal synthesis module 313.

The first reconstruction analog processing submodule 3122 performs processing, which includes, but is not limited to, frequency conversion and gain amplification, on the second analog interference cancellation signal. Specifically, the first reconstruction analog processing submodule 3122 includes: a first up-converter 31221 and a first gain amplifier 31222, where the first up-converter 31221 is configured to up-convert the second digital interference cancellation signal, to obtain a first up-converted analog signal, and output the first up-converted analog signal to the first gain amplifier 31222. In an actual application, the first up-converter 31221 may be implemented by using a frequency converter and a local oscillator, and up-converts, by using the frequency converter, a local oscillator frequency generated by the local oscillator and the second analog interference cancellation signal, to obtain the first up-converted analog signal whose frequency is a second preset frequency, and output the first up-converted analog signal to the first gain amplifier 31222. The first gain amplifier 31222 is configured to perform amplification processing on the first up-converted analog signal. The first gain amplifier 31222 may be implemented by using a power amplifier, and is configured to perform power amplification processing on the first up-converted analog signal, to obtain the first analog synthesis signal, and output the first analog synthesis signal to the first signal synthesis module 313.

The first signal synthesis module 313 includes two inputs and one output, where the two inputs are a receive antenna RX3 and the second digital-to-analog conversion module 312, and the one output is the analog receive processing module 306. The first signal synthesis module 313 is configured to cancel, according to the first analog synthesis signal, the self-interference signal in the analog receive signal received by the receive antenna, to remove the linear part of the self-interference signal from the analog receive signal. The first signal synthesis module synthesizes, in a manner of subtracting the receive signal at the receive front end from the signal output by the second digital-to-analog conversion module 312, the first analog synthesis signal and the analog receive signal received by the receive antenna, thereby removing the impact of the linear part of the self-interference signal on the receive channel.

It should be noted that the first digital interference cancellation module 310 may receive the first digital interference cancellation signal output by the first digital interference reconstruction module 309, where the first digital interference cancellation signal includes the non-linear part and the noise part of the self-interference signal that are introduced by a transmit channel; the first digital interference cancellation module 310 may further receive a receive signal that passes through the first analog-to-digital conversion module, where in this case, the receive signal is a digital signal, and the linear part, which is introduced by the digital transmit signal, of the self-interference signal has been removed from the receive signal, and the receive signal includes only the non-linear part and the noise part of the self-interference signal and a signal desired by a remote end. Therefore, at the first digital interference cancellation module 310, the non-linear part and the noise part of the self-interference signal that are introduced by the transmit channel may be removed from the receive signal in a signal cancellation manner, thereby improving interference signal cancellation performance.

This solution is not only applicable to an LTE (Long Term Evolution, Long Term Evolution) device, but also is applicable to a WCDMA (Wideband Code Division Multiple Access, Wideband Code Division Multiple Access) device, a TD-SCDMA (Time Division-Synchronous Code Division Multiple Access, Time Division-Synchronous Code Division Multiple Access) device, and a WiMax (Worldwide Interoperability for Microwave Access, Worldwide Interoperability for Microwave Access) device.

In the device provided in this embodiment of the present invention, in addition to an added first self-interference cancellation unit, a second self-interference cancellation unit is added, which can remove a linear part, introduced by a digital transmit signal, of a self-interference signal; in addition, interference reconstruction is performed by using a digital signal, thereby preventing a case of saturation at a transmit front end.

Figure 4:
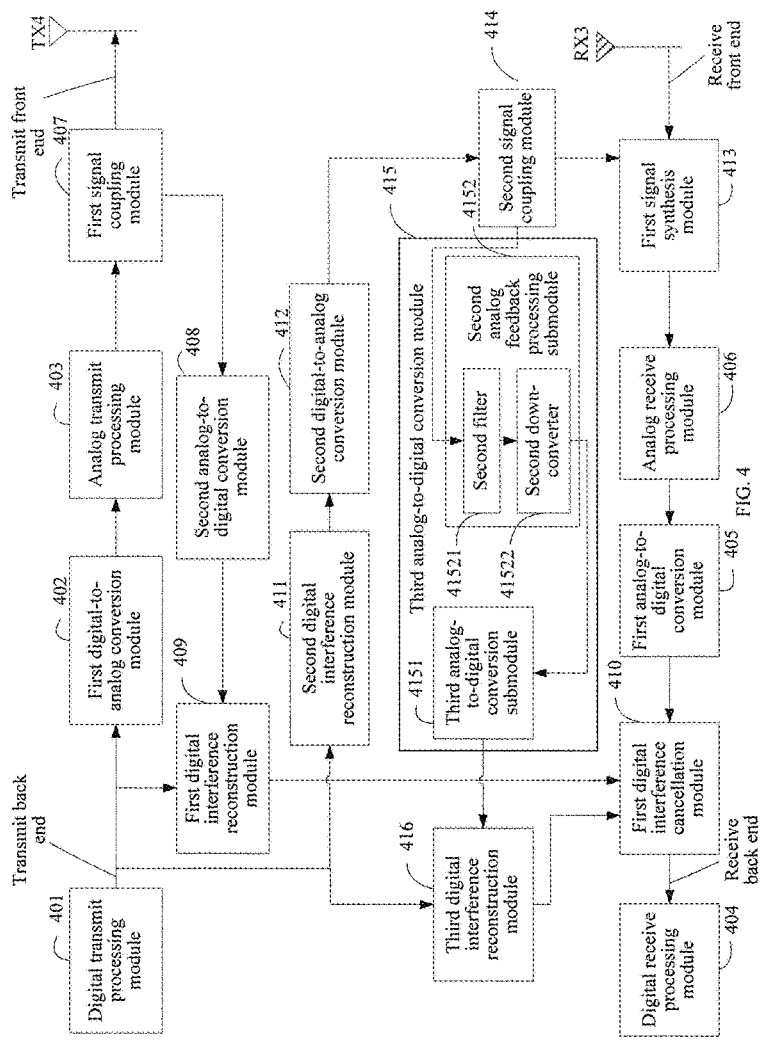
FIG. 4 is a schematic structural diagram of a self-interference signal cancellation device according to an embodiment of the present invention.

It should be noted that, when the self-interference cancellation units process a signal, some non-linear interference signals and noises may be introduced, and different non-linear interference signals may be introduced in different processing procedures; therefore, non-linear interference signals that are introduced by the second self-interference cancellation unit and the first self-interference cancellation unit may not be canceled by each other. To solve the foregoing problem, an embodiment of the present invention further provides a self-interference signal cancellation device. FIG. 4 is a schematic structural diagram of another self-interference signal cancellation device according to an embodiment of the present invention. Referring to FIG. 4, based on the embodiment in FIG. 3, a third self-interference cancellation unit is added to the device. The device includes: a digital transmit processing module 401, a first digital-to-analog conversion module 402, an analog transmit processing module 403, a transmit antenna TX4, a digital receive processing module 404, a first analog-to-digital conversion module 405, an analog receive processing module 406, and a receive antenna RX4.

Specific implementations of the foregoing modules are similar to the implementations of the modules in the embodiment shown in FIG. 2*a*, which are not described again in this embodiment of the present invention.

The device further includes a first self-interference cancellation unit. The first self-interference cancellation unit includes: a first signal coupling module 407, a second analog-to-digital conversion module 408, a first digital interference reconstruction module 409, and a first digital interference cancellation module 410.

A specific implementation of the first self-interference cancellation unit is similar to the implementation of the first self-interference cancellation unit in the embodiment shown in FIG. 3, which is not described again in this embodiment of the present invention.

The device further includes: a second self-interference cancellation unit. The second self-interference cancellation unit includes: a second digital interference reconstruction module 411, a second digital-to-analog conversion module 412, and a first signal synthesis module 413, where a specific implementation of the second self-interference cancellation unit is similar to the implementation of the second self-interference cancellation unit in the embodiment shown in FIG. 3, which is not described again in this embodiment of the present invention.

To remove a non-linear part and a noise part of a self-interference signal that are introduced by the second self-interference cancellation unit, the third self-interference cancellation unit is added, so as to obtain a third analog signal by coupling the second self-interference cancellation unit, thereby performing interference reconstruction according to the third analog signal, and further performing interference cancellation.

The device further includes: the third self-interference cancellation unit. The third self-interference cancellation unit is configured to: obtain a third analog signal by coupling a first analog synthesis signal; perform analog-to-digital conversion on the third analog signal, to obtain a third digital signal; perform interference reconstruction according to the third digital signal, to obtain a third digital interference cancellation signal; and cancel a self-interference signal in a first output signal according to the third digital interference cancellation signal, to obtain a second output signal, and output the second output signal to the digital receive processing module.

Specifically, the third self-interference cancellation unit includes: a second signal coupling module 414, a third analog-to-digital conversion module 415, and a third digital interference reconstruction module 416.

The second signal coupling module 414 includes one input and two outputs, where the one input is the second digital-to-analog conversion module 412, and the two outputs are the first signal synthesis module 413 and the third analog-to-digital conversion module 415. The second signal coupling module 414 is configured to obtain the third analog signal by coupling the first analog synthesis signal output by the second digital-to-analog conversion module 412, and output the third analog signal to the third analog-to-digital conversion module 415, where the third analog signal is a partial analog signal that is obtained by the second signal coupling module 414 by coupling the first analog synthesis signal.

The first analog synthesis signal includes a linear part that is introduced by a digital transmit signal, and the non-linear part and the noise part that are introduced by the second self-interference cancellation unit, in the self-interference signal. Therefore, the third analog signal also includes the linear part that is introduced by the digital transmit signal, and the non-linear part and the noise part that are introduced by the second self-interference cancellation unit, in the self-interference signal.

The third analog-to-digital conversion module 415 is configured to perform analog-to-digital conversion on the third analog signal, to obtain the third digital signal, and output the third digital signal to the third digital interference reconstruction module 416.

Specifically, the third analog-to-digital conversion module 415 includes: a second analog feedback processing submodule 4151 and a third analog-to-digital conversion submodule 4152.

One end of the second analog feedback processing submodule 4151 is connected to the second signal coupling module 414, and the other end is connected to the third analog-to-digital conversion submodule 4152. The second analog feedback processing submodule 4151 is configured to process the third analog signal, to obtain a fourth analog signal, and output the fourth analog signal to the third analog-to-digital conversion submodule 4152.

Specifically, the second analog feedback processing submodule 4151 includes: a second filter 41511 and a second down-converter 41512, where one end of the second filter 41511 is connected to the second signal coupling module 414, and the other end is connected to the second down-converter 41512; the second down-converter 41512 is connected to the third analog-to-digital conversion submodule 4152. The third filter 41511 is configured to perform filtering processing on the third analog signal, to obtain a second filtered analog signal, and output the second filtered analog signal to the second down-converter 41512. The second down-converter 41512 is configured to perform down-conversion processing on the second filtered analog signal, to obtain the fourth analog signal, and output the fourth analog signal to the third analog-to-digital conversion submodule 4152.

The third digital interference reconstruction module 416 includes two inputs and one output, where the two inputs are the digital transmit processing module 401 and the third analog-to-digital conversion module 415, and the one output is the first digital interference cancellation module 410. The third digital interference reconstruction module 416 is configured to perform interference reconstruction according to the third digital signal, to obtain the third digital interference cancellation signal, and output the third digital interference cancellation signal to the first digital interference cancellation module 410.

Specifically, the third digital interference reconstruction module 416 is configured to perform interference reconstruction according to a digital transmit signal output by the digital transmit processing module 401, remove a reconstruction signal of a digital transmit signal part from the third digital signal according to a reconstruction digital signal obtained by means of the interference reconstruction, to obtain the third digital interference cancellation signal, and output the third digital interference cancellation signal to the first digital interference cancellation module 410.

It should be noted that the third digital interference cancellation signal output by the third digital interference reconstruction module 416 includes the non-linear part and the noise part that are introduced by the second self-interference cancellation unit, in the self-interference signal.

In this embodiment of the present invention, a specific implementation process of the third digital interference reconstruction module 416 is similar to that of the first digital interference reconstruction module 409, which is not described again herein.

Correspondingly, the first digital interference cancellation module 410 is further configured to cancel the self-interference signal in the first output signal according to the third digital interference cancellation signal, to obtain the second output signal, and output the second output signal to the digital receive processing module 404.

In this case, the first digital interference cancellation module 410 in fact receives three signals, where: one signal is the first digital interference cancellation signal output by the first digital interference reconstruction module, where the first digital interference cancellation signal includes a non-linear part and a noise part in the self-interference signal that are introduced by a transmit channel; the second signal is the third digital interference cancellation signal output by the third digital interference reconstruction module 416, where the third digital interference cancellation signal includes the non-linear part and the noise part in the self-interference signal that are introduced by the second self-interference cancellation unit; the third signal is a digital signal output by the first analog-to-digital conversion module 405, where the digital signal output by the first analog-to-digital conversion module 405 includes a receive signal from which the linear part of the self-interference signal has been removed; therefore, interference cancellation by the first digital interference cancellation module 410 can remove, from the receive signal, the non-linear part and the noise part that are introduced by the transmit channel, and the non-linear part and the noise part that are introduced by the second self-interference cancellation unit, thereby canceling the self-interference signal in the receive signal to a greater extent, and improving overall performance of self-interference signal cancellation.

For example, based on the example in the embodiment shown in FIG. 2a, a digital signal output by the digital transmit processing module 401 is X[k] and is processed by the first digital-to-analog conversion module 402 and the analog transmit processing module 403, an analog signal output by the analog transmit processing module 403 is X[t]+N[t], and a signal received at a receive front end of a receive channel is H[t]*(X[t]+N[t])+S[t]. In the first self-interference cancellation unit, a first analog signal that the first signal coupling module 407 obtains by coupling the analog signal X[t]+N[t] output by the analog transmit processing module 403 is X[t]+N[t], a first digital signal obtained after the first analog signal is processed by the second analog-to-digital conversion module 408 is X[k]+N[k], a first digital interference cancellation signal that is obtained after a digital transmit signal part X[k] in the first digital signal is canceled by the first digital interference reconstruction module 409 and interference reconstruction is performed is $-H[k]*N[k]$. In the second self-interference cancellation unit, the second digital interference reconstruction module 411 is configured to perform interference reconstruction according to the digital transmit signal X[k] output by the digital transmit processing module 401, to obtain a second digital interference cancellation signal $-H[k]*X[k]$; after the second digital interference cancellation signal passes through the second digital-to-analog conversion module 412, a first analog synthesis signal includes a reconstruction signal $-H[t]*X[t]$ of a linear part of a self-interference signal and a non-linear part and noise part n[t] of the self-interference signal that are introduced by the second self-interference cancellation unit. In the third self-interference cancellation unit, a third analog signal obtained by the second signal coupling module 414 by coupling the first analog synthesis signal includes the reconstruction signal $-H[t]*X[t]$ of the linear part of the self-interference signal, and the non-linear part and noise part n[t] of the self-interference signal that are introduced by the second self-interference cancellation unit, that is, the third analog signal is $-H[t]*X[t]+n[t]$; a third digital signal obtained after the third analog signal is processed by the third analog-to-digital conversion module 415 is $-H[k]*X[k]+n[k]$; the third digital interference reconstruction module 416 performs interference reconstruction on the digital transmit signal output by the digital transmit processing module 401, to obtain a reconstruction digital signal H[k]*X[k], and a third digital interference cancellation signal obtained after the part of the reconstruction signal $-H[k]*X[k]$ of the linear part of the self-interference signal is removed from the third digital signal is n[k]. On the receive channel, an analog signal obtained after the first signal synthesis module 413 synthesizes the first analog synthesis signal $-H[t]*X[t]+n[t]$ and the receive signal H[t]*(X[t]+N[t])+S[t] at the receive front end is H[t]*N[t]+n[t]+S[t]; after the analog signal is processed by the analog receive processing module 406 and the first analog-to-digital conversion module 405, a digital receive signal output by the first analog-to-digital conversion module 405 is H[k]*N[k]+n[k]+S[k]. It can be learned from the foregoing data that the first digital interference cancellation module 410 has three inputs and one output, where the three inputs are the first digital interference cancellation signal $-H[k]*N[k]$ output by the first digital interference reconstruction module 409, the third digital interference cancellation signal n[k] output by the third digital interference reconstruction module 416, and the digital receive signal H[k]*N[k]+n[k]+S[k] output by the first analog-to-digital conversion module 405; a second output signal obtained after the first digital interference cancellation module 410 performs interference cancellation according to the three input signals is S[k], so that the linear part, a non-linear part and a noise part that are introduced by a transmit channel, and the non-linear part and the noise part that are introduced by the second self-interference cancellation unit, in the self-interference signal are removed, thereby canceling the self-interference signal in the receive signal to a greater extent, and improving overall performance of self-interference signal cancellation.

It should be noted that the foregoing process is only described by using an example in which the first digital interference cancellation module first cancels, according to the first digital interference cancellation signal output by the first self-interference cancellation unit, the self-interference signal included in a demodulated digital signal. However, in actual use, the first digital interference cancellation module may simultaneously cancel, according to an acquired first digital interference cancellation signal and third digital interference cancellation signal, self-interference signals in a digital signal demodulated on the receive channel, which is not specifically limited in this embodiment of the present invention.

This solution is not only applicable to an LTE (Long Term Evolution, Long Term Evolution) device, but also is applicable to a WCDMA (Wideband Code Division Multiple Access, Wideband Code Division Multiple Access) device, a TD-SCDMA (Time Division-Synchronous Code Division Multiple Access, Time Division-Synchronous Code Division Multiple Access) device, and a WiMax (Worldwide Interoperability for Microwave Access, Worldwide Interoperability for Microwave Access) device.

In the device provided in this embodiment of the present invention, a non-linear part and a noise part of a self-interference signal can be removed after interference cancellation is performed on the self-interference signal by using a first digital interference cancellation signal; by using a second self-interference cancellation unit, a linear part, which is introduced by a digital transmit signal, of the self-interference signal can be removed; by using a third self-interference cancellation unit, a non-linear part and a noise part that are introduced by the second self-interference cancellation unit can be removed, and interference reconstruction is performed by using a digital signal, thereby preventing a case of saturation at a transmit front end.

It should be noted that: when the self-interference signal cancellation device provided in the foregoing embodiment performs self-interference signal cancellation, description is given only by using an example of division of the foregoing functional modules. In an actual application, the foregoing functions may be allocated to different functional modules for implementation as required, that is, an internal structure of the device is divided into different functional modules, so as to implement all or some functions described above.

Figure 5:
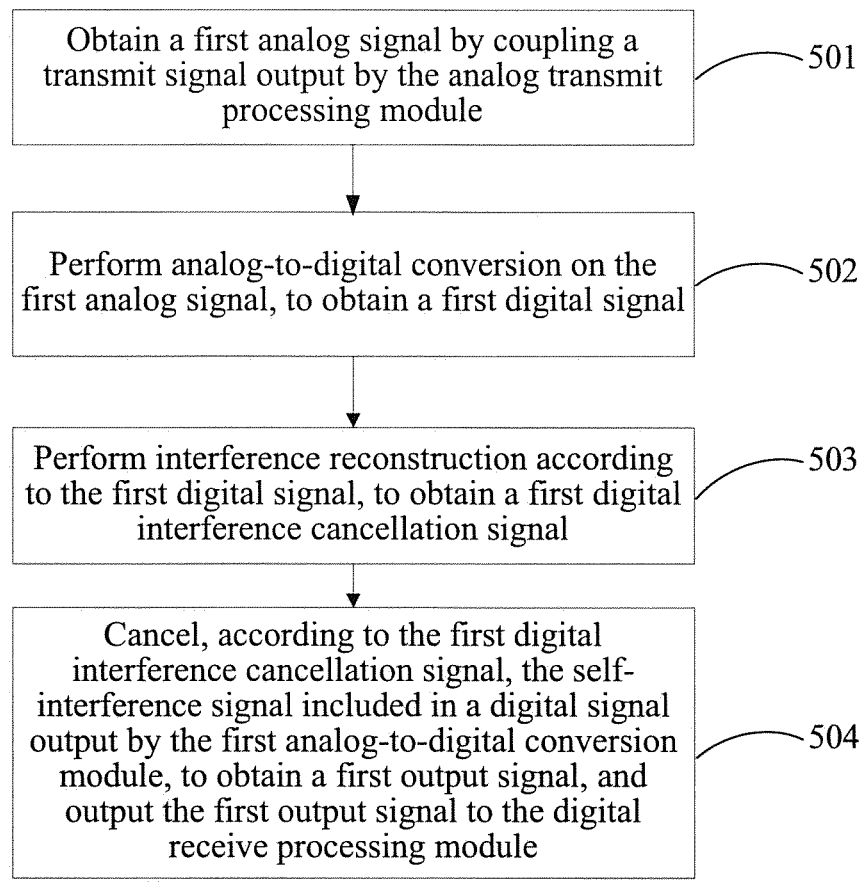
FIG. 5 is a flowchart of a self-interference signal cancellation method according to an embodiment of the present invention.

FIG. 5 is a flowchart of a self-interference signal cancellation method according to an embodiment of the present invention. The method is applicable to a communications device, where the device includes: a digital transmit processing module, an analog transmit processing module, a first analog-to-digital conversion module, an analog receive processing module, and a digital receive processing module, where a transmit signal output by the analog transmit processing module is transmitted through an air interface to the first analog-to-digital conversion module, forming a self-interference signal, and a digital signal output by the first analog-to-digital conversion module includes the self-interference signal. Referring to FIG. 5, the method includes:

501. Obtain a first analog signal by coupling the transmit signal output by the analog transmit processing module.

502. Perform analog-to-digital conversion on the first analog signal, to obtain a first digital signal.

503. Perform interference reconstruction according to the first digital signal, to obtain a first digital interference cancellation signal.

504. Cancel, according to the first digital interference cancellation signal, the self-interference signal included in the digital signal output by the first analog-to-digital conversion module, to obtain a first output signal, and output the first output signal to the digital receive processing module.

The method further includes: performing interference reconstruction according to a digital transmit signal output by the digital transmit processing module, to obtain a second digital interference cancellation signal; performing digital-to-analog conversion on the second digital interference cancellation signal, to obtain a first analog synthesis signal; canceling, according to the first analog synthesis signal, a self-interference signal in an analog receive signal received by a receive antenna, to remove a linear part of the self-interference signal from the analog receive signal; and outputting a signal obtained through the cancellation to the analog receive processing module.

Optionally, the method further includes: obtaining a third analog signal by coupling the first analog synthesis signal; performing analog-to-digital conversion on the third analog signal, to obtain a third digital signal; performing interference reconstruction according to the third digital signal, to obtain a third digital interference cancellation signal; and canceling a self-interference signal in the first output signal according to the third digital interference cancellation signal, to obtain a second output signal, and outputting the second output signal to the digital receive processing module.

Optionally, the method further includes: processing the first digital signal according to the digital transmit signal output by the digital transmit processing module, to remove a digital transmit signal part from the first digital signal; and performing interference reconstruction on the processed first digital signal, to obtain the first digital interference cancellation signal, and outputting the first digital interference cancellation signal to the first digital interference cancellation module.

Optionally, the method further includes: processing the third digital signal according to the digital transmit signal output by the digital transmit processing module, to remove a digital transmit signal part from the third digital signal; and performing interference reconstruction according to the third digital signal from which the digital transmit signal part is removed, to obtain the third digital interference cancellation signal, and outputting the third digital interference cancellation signal to the first digital interference cancellation module.

Optionally, the performing analog-to-digital conversion on the first analog signal, to obtain a first digital signal includes: processing the first analog signal, to obtain a second analog signal; and performing analog-to-digital conversion on the second analog signal, to obtain the first digital signal.

Optionally, the processing the first analog signal, to obtain a second analog signal includes: performing filtering processing on the first analog signal, to obtain a first filtered analog signal; and down-converting the first filtered analog signal, to obtain the second analog signal.

Optionally, the performing digital-to-analog conversion on the second digital interference cancellation signal, to obtain a first analog synthesis signal includes: performing digital-to-analog conversion on the second digital interference cancellation signal, to obtain a second analog interference cancellation signal; and processing the second analog interference cancellation signal output by the second digital-to-analog conversion submodule, to obtain the first analog synthesis signal.

Optionally, the processing the second analog interference cancellation signal output by the second digital-to-analog conversion submodule, to obtain the first analog synthesis signal includes: up-converting the second digital interference cancellation signal, to obtain a first up-converted analog signal; and performing amplification processing on the first up-converted analog signal, to obtain the first analog synthesis signal.

Optionally, the performing analog-to-digital conversion on the third analog signal, to obtain a third digital signal includes: processing the third analog signal, to obtain a fourth analog signal; and performing analog-to-digital conversion on the third analog signal output by the second analog feedback processing submodule, to obtain the third digital signal.

Optionally, the processing the third analog signal, to obtain a fourth analog signal includes: performing filtering processing on the third analog signal, to obtain a second filtered analog signal; and performing down-conversion processing on the second filtered analog signal, to obtain the fourth analog signal.

In addition, the self-interference signal cancellation method provided in the foregoing embodiment and the embodiment of the self-interference signal cancellation device belong to a same idea. For a specific implementation process of the method, refer to the device embodiment for detail, which is not described again herein.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A self-interference signal cancellation device, comprising:
a digital transmit processing module, an analog transmit processing module, a first analog-to-digital conversion module, an analog receive processing module, and a digital receive processing module,
wherein the analog transmit processing module is configured to output a transmit signal for transmission through an air interface to the first analog-to-digital conversion module, forming a self-interference signal, and wherein the first analog-to-digital conversion module is configured to convert the self-interference signal to a digital output signal;
a first signal coupling module, a second analog-to-digital conversion module, a first digital interference reconstruction module, and a digital interference cancellation module,
wherein the first signal coupling module is configured to obtain a first analog signal by coupling the transmit signal output by the analog transmit processing module, and output the first analog signal to a second analog-to-digital conversion module;
wherein the second analog-to-digital conversion module comprises: a filter, a down-converter, and an analog-to-digital converter, and wherein:
the filter is configured to perform filtering processing on the first analog signal, to obtain a first filtered analog signal, and output the first filtered analog signal to the down-converter,
the down-converter is configured to down-convert the first filtered analog signal, to obtain a second analog signal, and output the second analog signal to the analog-to-digital converter, and
the analog-to-digital converter is configured to perform analog-to-digital conversion on the second analog signal, to obtain a first digital signal, and output the first digital signal to the first digital interference reconstruction module,
wherein the first digital interference reconstruction module is configured to perform interference reconstruction according to the first digital signal, to obtain a first digital interference cancellation signal, and output the first digital interference cancellation signal to the digital interference cancellation module, and
wherein the digital interference cancellation module is configured to cancel, according to the first digital interference cancellation signal, the self-interference signal comprised in the digital signal output by the first analog-to-digital conversion module, to obtain a first output signal, and output the first output signal to the digital receive processing module;
a second self-interference cancellation unit configured to:
perform interference reconstruction according to a digital transmit signal output by the digital transmit processing module, to obtain a second digital interference cancellation signal;
perform digital-to-analog conversion on the second digital interference cancellation signal, to obtain a first analog synthesis signal;
cancel, according to the first analog synthesis signal, a self-interference signal in an analog receive signal received by a receive antenna, to remove a linear part of the self-interference signal from the analog receive signal; and
output a signal obtained through the cancellation to the analog receive processing module,
wherein the second self-interference cancellation unit comprises a second digital interference reconstruction module, a second digital-to-analog conversion module, and a first signal synthesis module, wherein:
the second digital interference reconstruction module is configured to perform interference reconstruction according to the digital transmit signal output by the digital transmit processing module, to obtain the second digital interference cancellation signal, and output the second digital interference cancellation signal to the second digital-to-analog conversion module,
the second digital-to-analog conversion module is configured to perform digital-to-analog conversion on the second digital interference cancellation signal, to obtain the first analog synthesis signal, and output the first analog synthesis signal to the first signal synthesis module, and
the first signal synthesis module is configured to cancel, according to the first analog synthesis signal, the self-interference signal in the analog receive signal received by the receive antenna, to remove the linear part of the self-interference signal from the analog receive signal; and
a third self-interference cancellation unit configured to:
obtain a third analog signal by coupling the first analog synthesis signal;
perform analog-to-digital conversion on the third analog signal, to obtain a third digital signal;
perform interference reconstruction according to the third digital signal, to obtain a third digital interference cancellation signal; and
cancel a self-interference signal in the first output signal according to the third digital interference cancellation signal, to obtain a second output signal, and output the second output signal to the digital receive processing module.

2. The device according to claim 1 wherein:
the second analog-to-digital conversion module comprises:
a low-noise amplifier, configured to perform low-noise amplification on the first analog signal output by the first signal coupling module, to obtain a first amplified analog signal, and output the first amplified analog signal to the filter; and
the filter is configured to perform filtering processing on the first amplified analog signal to obtain a first filtered analog signal.

3. The device according to claim 1, wherein the third self-interference cancellation unit comprises:
a second signal coupling module, a third analog-to-digital conversion module, and a third digital interference reconstruction module, wherein:
the second signal coupling module is configured to obtain the third analog signal by coupling the first analog synthesis signal, and output the third analog signal to the third analog-to-digital conversion module;
the third analog-to-digital conversion module is configured to perform analog-to-digital conversion on the third analog signal, to obtain the third digital signal, and output the third digital signal to the third digital interference reconstruction module; and
the third digital interference reconstruction module is configured to perform interference reconstruction according to the third digital signal, to obtain the third digital interference cancellation signal, and output the third digital interference cancellation signal to the digital interference cancellation module, wherein correspondingly, the digital interference cancellation module is further configured to cancel the self-interference signal in the first output signal according to the third digital interference cancellation signal, to obtain the second output signal, and output the second output signal to the digital receive processing module.

4. The device according to claim 3, wherein the third digital interference reconstruction module is configured to:
process the third digital signal according to the digital transmit signal output by the digital transmit processing module, to remove a digital transmit signal part from the third digital signal; and
perform interference reconstruction according to the third digital signal from which the digital transmit signal part is removed, to obtain the third digital interference cancellation signal, and output the third digital interference cancellation signal to the digital interference cancellation module.

5. The device according to claim 3, wherein the third analog-to-digital conversion module comprises:
a second analog feedback processing submodule and a third analog-to-digital conversion submodule, wherein:
the second analog feedback processing submodule is configured to process the third analog signal, to obtain a fourth analog signal, and output the fourth analog signal to the third analog-to-digital conversion submodule; and
the third analog-to-digital conversion submodule is configured to perform analog-to-digital conversion on the fourth analog signal output by the second analog feedback processing submodule, to obtain the third digital signal, and output the third digital signal to the third digital interference reconstruction module.

6. The device according to claim 5, wherein the second analog feedback processing submodule comprises:
a second filter and a second down-converter, wherein:
the second filter is configured to perform filtering processing on the third analog signal, to obtain a second filtered analog signal, and output the second filtered analog signal to the second down-converter; and
the second down-converter is configured to perform down-conversion processing on the second filtered analog signal, to obtain the fourth analog signal, and output the fourth analog signal to the third analog-to-digital conversion submodule.

7. The device according to claim 1, wherein the first digital interference reconstruction module is configured to:
process the first digital signal according to the digital transmit signal output by the digital transmit processing module, to remove a digital transmit signal part from the first digital signal.

8. The device according to claim 1, wherein the second digital-to-analog conversion module comprises:
a second digital-to-analog conversion submodule and a first reconstruction analog processing submodule, wherein:
the second digital-to-analog conversion submodule is configured to perform digital-to-analog conversion on the second digital interference cancellation signal, to obtain a second analog interference cancellation signal, and output the second analog interference cancellation signal to the first reconstruction analog processing submodule; and
the first reconstruction analog processing submodule is configured to process the second analog interference cancellation signal output by the second digital-to-analog conversion submodule, to obtain the first analog synthesis signal, and output the first analog synthesis signal to the first signal synthesis module.

9. The device according to claim 8, wherein the first reconstruction analog processing submodule comprises:
a first up-converter and a first gain amplifier, wherein:
the first up-converter is configured to up-convert the second digital interference cancellation signal, to obtain a first up-converted analog signal, and output the first up-converted analog signal to the first gain amplifier; and
the first gain amplifier is configured to perform amplification processing on the first up-converted analog signal, to obtain the first analog synthesis signal, and output the first analog synthesis signal to the first signal synthesis module.

\* \* \* \* \*